US012100236B2

United States Patent
Lee et al.

(10) Patent No.: US 12,100,236 B2
(45) Date of Patent: Sep. 24, 2024

(54) ADJUSTMENT OF VEHICLE MECHANISM BASED ON SENSOR INPUT

(71) Applicant: Lenovo (Singapore) Pte. Ltd., Singapore (SG)

(72) Inventors: Jonathan Co Lee, Cary, NC (US); Russell Speight VanBlon, Raleigh, NC (US); Philip Lee Childs, Fort Wayne, IN (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 867 days.

(21) Appl. No.: 16/844,975

(22) Filed: Apr. 9, 2020

(65) Prior Publication Data

US 2021/0319214 A1 Oct. 14, 2021

(51) Int. Cl.
*G06K 9/00* (2022.01)
*B60N 2/02* (2006.01)
*B60R 11/04* (2006.01)
*B62D 1/18* (2006.01)
*G06V 40/10* (2022.01)

(52) U.S. Cl.
CPC ........... *G06V 40/10* (2022.01); *B60N 2/0224* (2013.01); *B60R 11/04* (2013.01); *B62D 1/18* (2013.01)

(58) Field of Classification Search
CPC .... G06V 40/10; G06V 40/172; B60N 2/0224; B60N 2/002; B60N 2/0244; B60R 11/04; B60R 1/072; B62D 1/18; B62D 1/181
USPC .......................................................... 701/49
See application file for complete search history.

(56) References Cited

U.S. PATENT DOCUMENTS

| | | | |
|---|---|---|---|
| 10,324,463 B1* | 6/2019 | Konrardy | G05D 1/0278 |
| 10,482,226 B1* | 11/2019 | Konrardy | G08G 1/161 |
| 11,498,500 B1* | 11/2022 | Pertsel | G06V 40/103 |
| 2014/0172990 A1* | 6/2014 | Wan | H04L 51/14 |
| | | | 709/206 |
| 2014/0195116 A1* | 7/2014 | Hrovat | B60W 30/143 |
| | | | 701/38 |
| 2016/0354027 A1* | 12/2016 | Benson | A61B 5/1102 |
| 2017/0032673 A1* | 2/2017 | Scofield | A61B 5/4845 |
| 2017/0282753 A1* | 10/2017 | Zouzal | B60N 2/22 |
| 2017/0330044 A1* | 11/2017 | Telpaz | G05D 1/0088 |
| 2018/0141543 A1* | 5/2018 | Krosschell | B60W 10/04 |
| 2018/0173230 A1* | 6/2018 | Goldman-Shenhar | |
| | | | B60W 50/14 |
| 2018/0365772 A1* | 12/2018 | Thompson | G06Q 40/08 |
| 2019/0232748 A1* | 8/2019 | Mohamed | B60G 17/0165 |
| 2020/0100079 A1* | 3/2020 | Boehm | H04L 67/30 |
| 2020/0128066 A1* | 4/2020 | Sugimoto | G06F 9/5027 |
| 2020/0282791 A1* | 9/2020 | Lalwani | B60G 17/016 |
| 2022/0281470 A1* | 9/2022 | Hanchett | G07C 5/008 |

* cited by examiner

*Primary Examiner* — Gims S Philippe
(74) *Attorney, Agent, or Firm* — John M. Rogitz; John L. Rogitz (57) ABSTRACT

In one aspect a vehicle may include a motor, a drive train and chassis, a battery, a seat assembly including a seat in which people can sit, at least one processor, a camera accessible to the at least one processor, and storage accessible to the at least one processor. The storage may include instructions executable by the at least one processor to receive data pertaining to at least one characteristic of a person and to, based on the data, adjust at least one mechanism within the vehicle.

20 Claims, 5 Drawing Sheets

ADJUSTMENT OF VEHICLE MECHANISM BASED ON SENSOR INPUT

FIELD

The present application relates to technically inventive, non-routine solutions that are necessarily rooted in computer technology and that produce concrete technical improvements.

BACKGROUND

As recognized herein, different people of different sizes and body types are often not provided with straightforward and simple ways to adjust various aspects of a vehicle that they wish to drive, such as to adjust the position of a mirror or steering wheel. Even where past configurations for one person or another might be electronically stored, this fails to aid others for straightforward configuration when they too wish to drive the same vehicle. Not to mention that the process for initially configuring the vehicle and saving those configurations is itself often complex and confusing. There are currently no adequate solutions to the foregoing computer-related, technological problem.

SUMMARY

Accordingly, in one aspect a vehicle includes a motor, a drive train and chassis, a battery, a seat assembly including a seat in which people can sit, at least one processor, a camera accessible to the at least one processor, and storage accessible to the at least one processor. The storage includes instructions executable by the at least one processor to receive input from the camera and, based on the input from the camera, profile a person. The instructions are also executable to, based on the profiling of the person, adjust at least one mechanism within the vehicle.

In some implementations, the person may be profiled without accessing data regarding the person that is already stored in a user profile prior to receipt of the input from the camera. For example, the person may be profiled based on height as determined based on the input from the camera. In this example, the at least one mechanism may include the seat assembly and the seat assembly may be adjusted to a configuration correlated to the height of the person. The at least one mechanism may also include a steering wheel assembly and the steering wheel assembly may be adjusted to a configuration correlated to the height of the person. Still further, the at least one mechanism may include a mirror assembly and the mirror assembly may be adjusted to a configuration correlated to the height of the person.

Still further, in some implementations the person may be profiled using the input from the camera based on age, weight, and/or sex.

Also, in some implementations, the instructions may be executable to store facial recognition data pertaining to the person that is generated based on input from the camera and to also store data pertaining to a configuration of the at least one mechanism. The configuration of the at least one mechanism may include the adjustment to the at least one mechanism performed by the vehicle based on the input from the camera itself, and/or another adjustment to the at least one mechanism performed by the vehicle based on user input. Furthermore, in some examples the vehicle may be a first vehicle, the facial recognition data and the data pertaining to the configuration of the at least one mechanism may be stored at a remotely-located server, and the facial recognition data and the data pertaining to the configuration of the at least one mechanism may be accessible at the remotely-located server by a second vehicle different from the first vehicle for application of the data pertaining to the configuration of the at least one mechanism by the second vehicle based on the second vehicle recognizing the person.

Also in some implementations, the instructions may be executable to profile the person to identify the person by face based on the input from the camera and to, based on the identification of the person by face, adjust at least one mechanism within the vehicle according to a preset for the at least one mechanism that is associated with the person and that is configured prior to receipt of the input from the camera.

In another aspect, a method includes receiving, at a vehicle, data pertaining to at least one characteristic of a person. The method also includes adjusting at least one mechanism within the vehicle based on the data.

In some implementations, the data may be received from a biometric sensor on the vehicle, such as a fingerprint sensor and/or a camera. The data may be used to identify a preconfigured profile for the person, where the preconfigured profile may indicate an adjustment to make to the at least one mechanism and where the adjustment may be made to the at least one mechanism based on the preconfigured profile.

Additionally, in some implementations the data may be first data and the method may include receiving, at the vehicle, user input to make a first adjustment to the at least one mechanism as well as uploading second data to a cloud profile for the person based on the user input. The second data may indicate the first adjustment to the at least one mechanism.

Further, in some implementations the data may be received from a camera on the vehicle, the data may be used by the vehicle to determine a height of the person, and the height of the person may be used to adjust the at least one mechanism. So, for example, the data may be first data and the person's height may be determined by the vehicle without the vehicle accessing second data regarding the person that is already stored in a user profile associated with the person and that was established prior to receipt of the first data.

In still another aspect, at least one computer readable storage medium (CRSM) that is not a transitory signal includes instructions executable by at least one processor to receive, at a vehicle, data pertaining to at least one characteristic of a person. The instructions are also executable to adjust at least one mechanism within the vehicle based on the data.

For example, the data may be received from one or more of a camera and a fingerprint sensor, the data may be used to identify one or more of a height of the person and a preconfigured profile for the person, and the adjustment may be made to the at least one mechanism based on the height of the person and/or based on the preconfigured profile.

The details of present principles, both as to their structure and operation, can best be understood in reference to the accompanying drawings, in which like reference numerals refer to like parts, and in which:

DETAILED DESCRIPTION

Among other things, the present application discusses a vehicle's artificial intelligence ability to detect unique user characteristics such as vertical height and weight prior to the user's entry by utilizing exterior cameras and/or other sensors so that a seat in the vehicle can be adjusted accordingly. The vehicle may also have the ability to set a specific user seat profile based on recognition of the user, including any prior seat adjustments made by the user, where that recognition may occur through biometric recognition (e.g., facial recognition or fingerprint identification), client device proximity, etc. Other user specifications may also be stored in the profile, including those related to mirror positions, internal temperatures, music, steering wheel height, car suspension, etc.

The vehicle may then save the user's profile to a cloud-based platform for use in the future.

For example, if a driver approaches the vehicle, the vehicle may identify how tall the person is using exterior cameras or sensors on the vehicle and then adjust the driver's seat automatically to help the person get in (e.g., moving the seat back) even if the user does not have a cloud-based profile set up yet.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C #or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
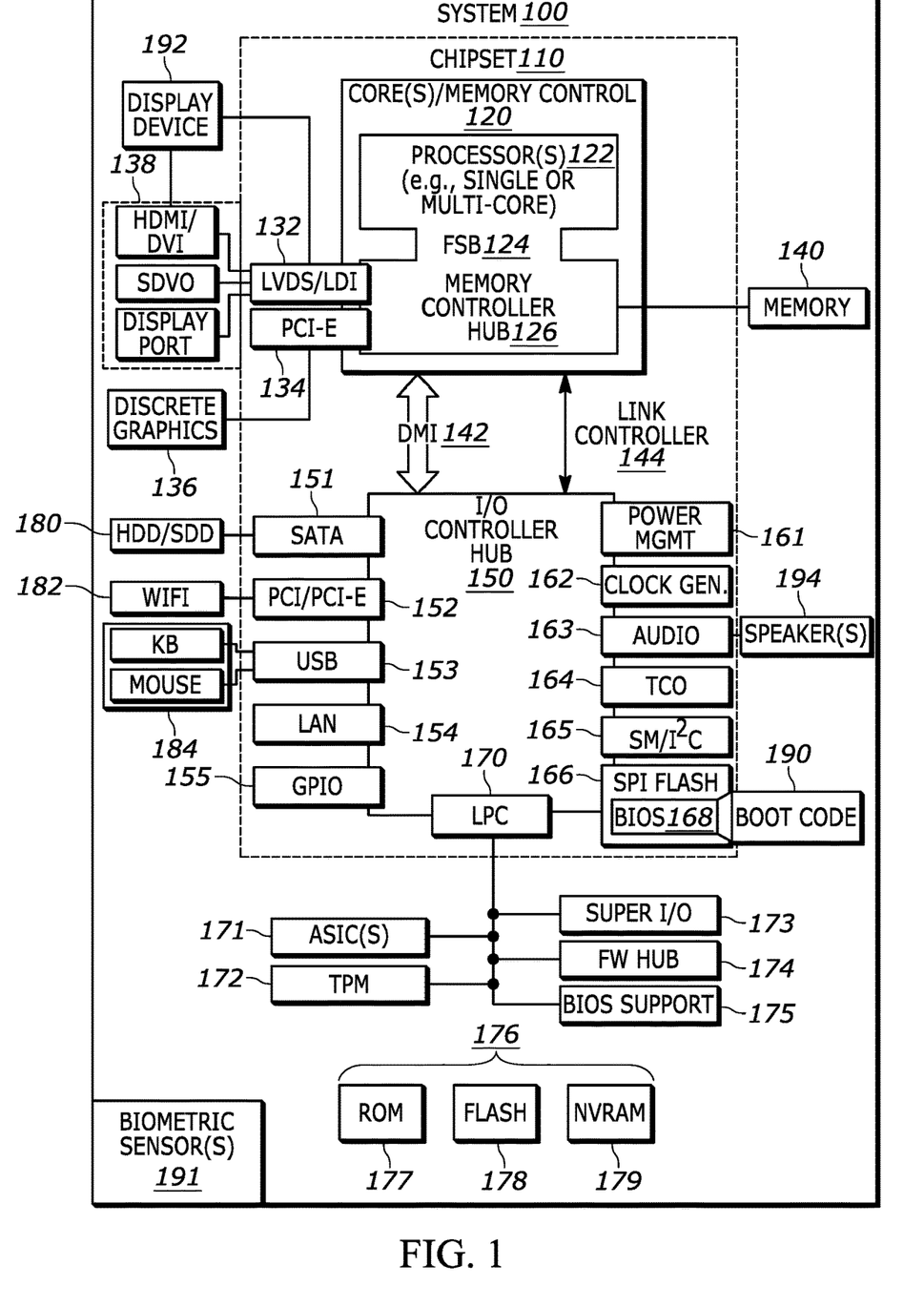
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include one or more biometric sensors 191. For example, the biometric sensor may be a fingerprint reader that provides input to the processor 122. The biometric sensor may also be a camera that gathers one or more images and provides the images to the processor 122. The camera may be, for example, a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
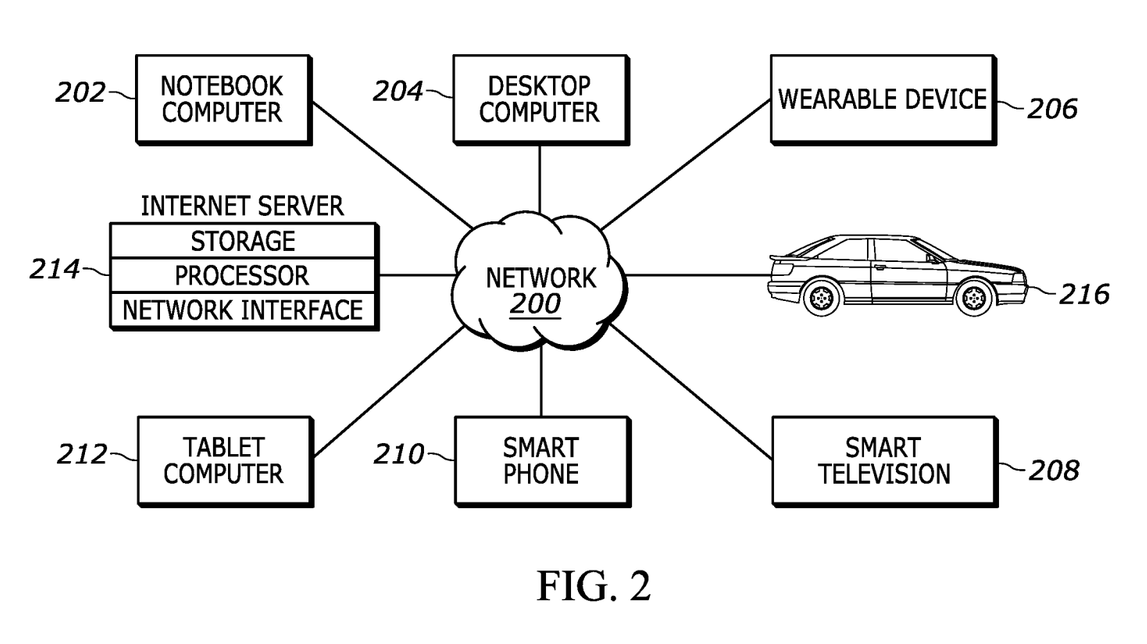
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a vehicle 216, and a server 214 such as an Internet server that may provide cloud storage accessible to the devices 202-212, 216. It is to be understood that the devices 202-216 may be configured to communicate with each other over the network 200 to undertake present principles.

Figure 3:
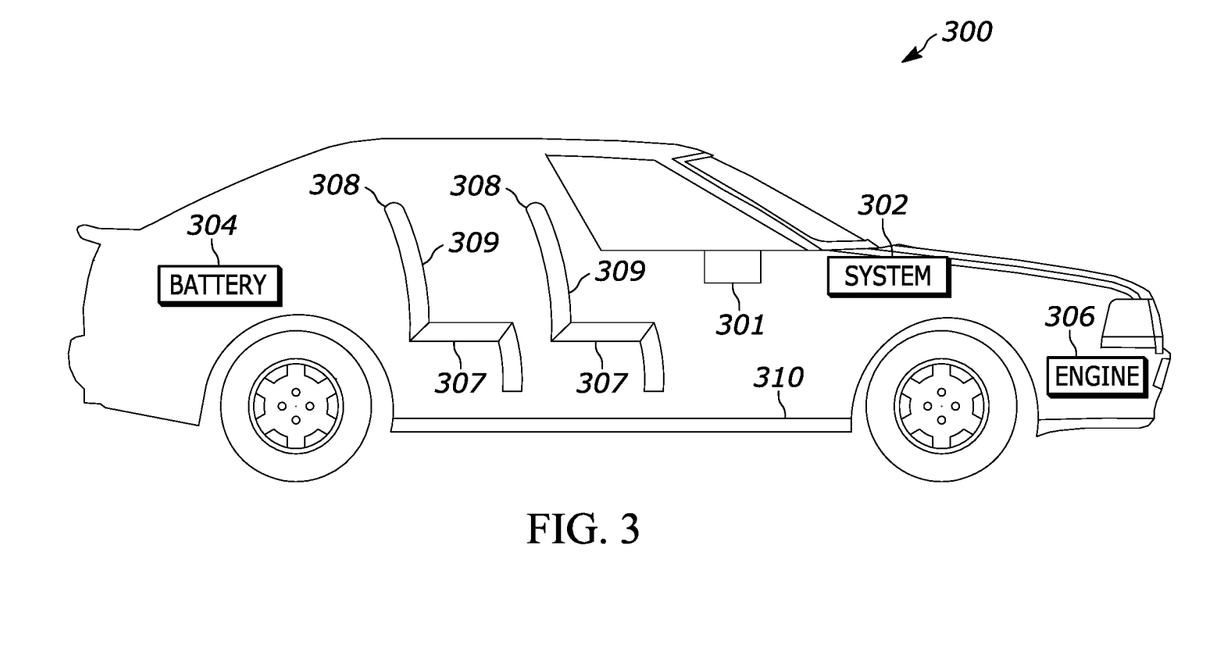
FIG. 3 shows an example vehicle consistent with present principles.

FIG. 3 shows an example vehicle 300 that may be similar to the vehicle 216 referenced above, e.g., a car or pickup truck or sport utility vehicle. The vehicle 300 may include an onboard computer system/entertainment system 302 that may include components such as those set forth above in reference to the system 100 in order to operate consistent with present principles. The system 302 may be connected to and/or communicate with one or more biometric sensors 301 on the vehicle 300, such as a camera or fingerprint reader.

The system 302 may also communicate with and control a battery and/or battery pack 304 that provides power to other parts of the vehicle 300. Additionally, the system 302 may communicate with and control a motor (e.g., electric motor) and/or internal combustion engine 306 that can provide power to propel the vehicle 300 separately from or in conjunction with power from the battery 304 to propel the vehicle 300. The engine 306 may be a fossil fuels-powered engine, such as a gasoline-powered engine or a diesel-powered engine. The vehicle 300 may also include plural seat or chair assemblies 308 that include respective seats in which a driver and passengers in the vehicle 300 may sit. As shown, each seat of each assembly 308 may include a seat base/bottom 307 and a seat back 309. The vehicle 300 may also include a drive train and chassis 310.

It is to be further understood that the vehicle 300 may include still other components not shown for clarity, such as brakes for slowing and stopping the vehicle as well as a regenerative braking mechanism for harvesting kinetic energy during braking of the vehicle to charge battery cells within the battery 304. Still other ways of charging the vehicle's battery may be used, such as charging the battery using energy taken from the engine 306 (e.g., using an alternator). The vehicle 300 may also include other mechanisms described herein, including a steering wheel assembly that may include a steering wheel that a user may turn to turn the vehicle 300 left or right and that may be adjustable mechanically and/or electronically. Various mirror assemblies may also be included, including a rear-view mirror assembly having a rear-view mirror mounted to the windshield of the vehicle 300 as well as side view mirror assemblies with side view mirrors mounted to the front doors of each side of the vehicle 300. The vehicle may also include a suspension system and a heating ventilation and air conditioning (HVAC) system, for example.

Figure 4:
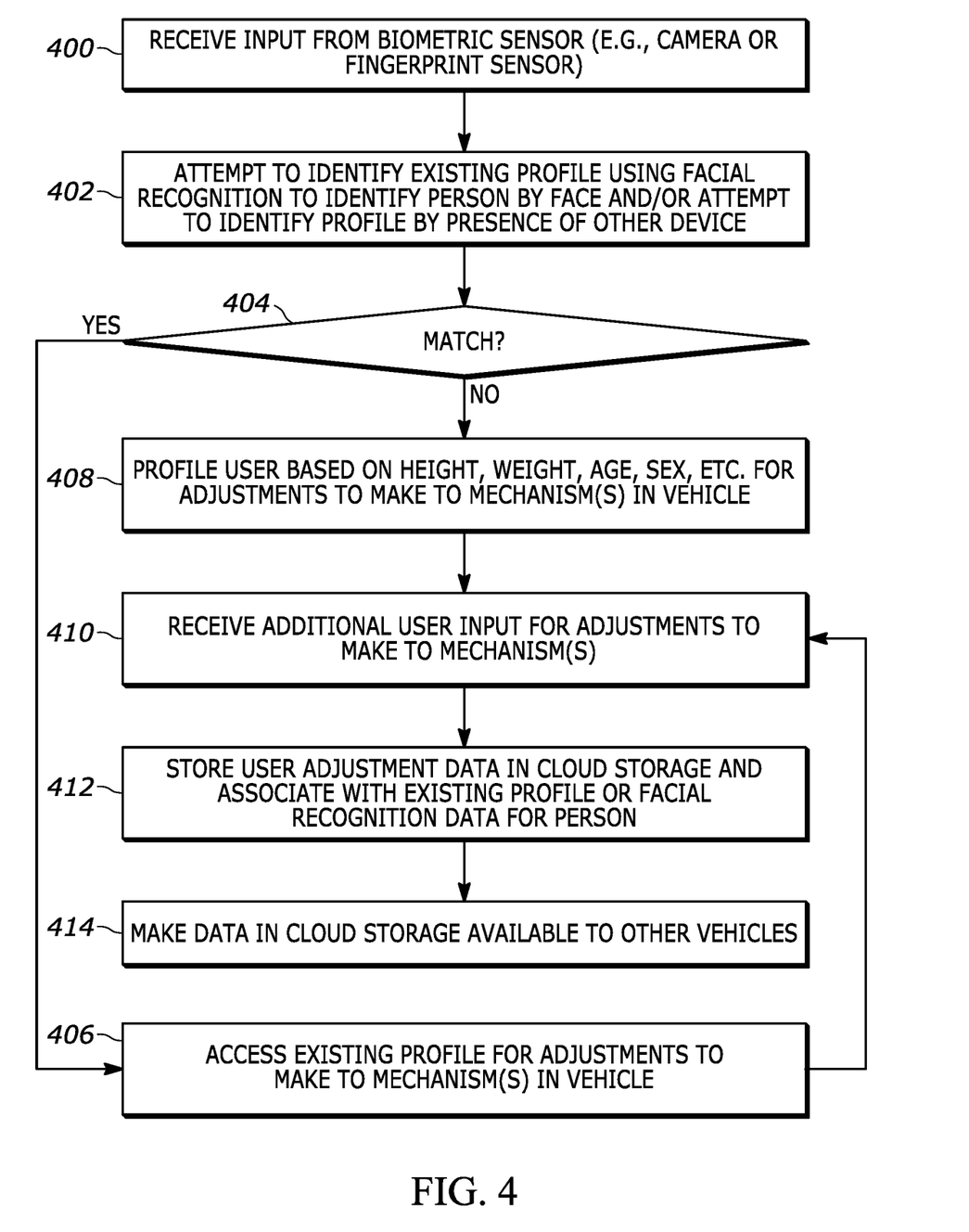
FIG. 4 shows a flow chart of an example algorithm consistent with present principles.

Referring now to FIG. 4, it shows example logic that may be executed by a device such as the system 100 and/or an onboard computer system of a vehicle consistent with present principles. Beginning at block 400, the device may receive input from one or more biometric sensors on or in communication with the device, such as a fingerprint reader on a door handle of the vehicle that a person might touch while opening a door of the vehicle. The biometric sensor may also be established by a camera on the exterior of the vehicle that can image a person so that the device can attempt to identify or profile the person responsive to the person being determined as coming within a threshold distance to the vehicle (e.g., two feet). The distance from the person to the vehicle may be determined using input from the camera as well as object recognition and/or spatial analysis software, for example.

From block 400 the logic may proceed to block 402. At block 402 the device may attempt to identify an existing profile associated with the person by executing facial recognition software using the input from the camera to attempt to identify the person by face and to identify an associated profile that the person has already setup. Additionally, or alternatively, the device may attempt to identify the existing profile by attempting to match a fingerprint detected by the fingerprint sensor to an associated profile for the fingerprint.

As another example, the device may attempt to identify the existing profile by receiving wireless communications from another device already associated with the person, where the other device may have a unique internet protocol (IP) address, media access control (MAC) address, etc. that is identifiable from the wireless communications to thereby identify an associated profile. In some implementations, profile lookup based on wireless communications may be initiated responsive to the other device coming within a threshold distance of the vehicle (e.g., two feet) as may be determined using a received signal strength indicator (RSSI) algorithm.

Regardless of how it is identified, note that the profile itself may be stored at a remotely located server that is accessible to the device, such as in cloud storage hosted by the server.

From block 402 the logic may then proceed to decision diamond 404. At diamond 404 the device may determine whether a matching profile has in fact been located based on the process(es) of block 402. An affirmative determination may cause the logic to proceed to block 406, whereas a negative determination may cause the logic to instead proceed to block 408.

First describing block 406, the device may use information indicated in the existing profile as already configured by the person, or as configured by the device for the person based on profiling height and other characteristics of the person, in order to make one or more adjustments to mechanisms of the vehicle. For example, specifications or presets in the profile may be applied to adjust the positioning of the base and back of a vehicle seat with respect to each other (e.g., using electronic components of the associated seat assembly for moving the base and back). The position of the seat base may also be adjusted with respect to a steering wheel of a steering wheel assembly in the vehicle if the seat being adjusted is the driver's seat. The height of the steering wheel as well as its distance from the vehicle's driver's seat base may also be electronically adjusted using the steering wheel assembly and specifications or presets in the profile. Positions of mirrors within mirror assemblies, and the angles of the mirrors with respect to the driver's seat, may also be adjusted using electronic components within the respective mirror assemblies according to specifications or presets in the profile. The mirrors may be side view mirrors or rear-view mirrors or otherwise.

As other examples, specifications or presets in the profile may also indicate an optimal ambient temperature at which the internal environment within the vehicle is to be maintained using the vehicle's heating ventilation and air conditioning (HVAC) system, a particular height and/or hardness of the vehicle's suspension system, and a particular radio station or music or music type to auto-play using the vehicle's electronic entertainment system or radio responsive to identifying the person as entering the vehicle.

Now describing block 408, at this step the device may use characteristics of the person that may have been identified using input from the camera to make adjustments to one or more of the vehicle's mechanisms even though a preexisting profile for the person has not been located (e.g., the person is a "new" person for which no data already exists in the profile database/cloud storage). For example, the device may use input from the camera as well as object recognition and/or spatial analysis software to identify a height and weight of the person responsive to the person coming within a threshold distance of the vehicle. Age and gender/sex may also be identified using the object recognition software. The physical profiling of the person by identifying these characteristics may then be used to determine one or more adjustments to make to mechanisms of the vehicle.

For example, a relational database in cloud storage or in local storage may be accessed by the device to correlate the identified height, identified weight, or combination of height and weight to a particular position of the base of a seat in which the person is identified as moving toward or sitting in. The position of the base may be adjusted with respect to the vehicle's chassis, steering wheel (if the seat is the driver's seat), dashboard (if the seat is the front passenger's seat), etc. E.g., the database may indicate that a person that is six feet zero inches tall is correlated to a seat base distance from a front of the steering wheel of two inches in the X dimension, and that a person that is six feet one inch tall is correlated to a seat base distance from the front of the steering wheel of two and a half inches in the X dimension.

The back of the seat may also be adjusted based on correlations in the relational database between height and/or weight and position of the seat back. Configurations of other vehicle mechanisms may also be adjusted based on height and/or weight correlations, including adjustments to the steering wheel of the steering wheel assembly, adjustments to vehicle mirrors of respective mirror assemblies, adjustments to operation and operating parameters of the vehicle's HVAC system, and adjustments to the height of the vehicle's suspension system.

The relational database may also indicate configurations of various vehicle mechanisms to apply based on age and sex, either in combination with configurations for height/weight or that may override or cede to the height/weight configurations when conflicts in configurations exist between height/weight adjustments and age/sex adjustments. Whether one set of adjustments overrides or cedes to other adjustments based on other profiling parameters may vary depending on configuration by the vehicle's manufacturer, user preference, or defaults for the vehicle.

Providing more detail on adjustments to vehicle mechanisms that might be performed based on age and sex, the person may be identified as belonging to one sex or another as well as to a particular age group, and then the relational database may be used to identify a correlation in the database between sex or age group to various seat component adjustments to make, steering wheel adjustments to make, and mirror adjustments to make. For example, if the person is a male or within a younger age group then the seat base may be adjusted to be farther from the steering wheel than for females or older age groups, while the height of the steering wheel itself may be higher for males and younger age groups than for females and older age groups. Mirrors may also be adjusted to account for a higher eye height with respect to the mirrors themselves for males and younger age groups as opposed to females and older age groups.

As another example, the vehicle's suspension system may be set for the vehicle to ride at a certain higher height and with more hardness/less bounce for males and younger age groups than for females and older age groups. The vehicle's HVAC system may also be set to maintain internal ambient air temperature at a lower temperature (e.g., seventy two degrees Fahrenheit) and to use a higher fan speed for males and young age groups than another temperature (e.g., seventy four degrees Fahrenheit) and fan speed for females and older age groups.

The vehicle's entertainment system may also have its operation adjusted based on the sex and age of the person. For example, the volume level of audio that is output using the vehicle's speakers may be louder for males and younger age groups than for females and older age groups. Music type may also vary based on age and sex. For example, classical music playback may be initiated for seniors seventy-five years old and above, while rock or rap music may be initiated for people within the age bracket of eighteen to forty-five.

Regarding the database itself that may have one or more of the foregoing correlations, note that it may have been configured by, e.g., a system administrator or developer or manufacturer of the vehicle.

Still in reference to FIG. 4, note that from either of blocks 406 or 408 the logic may then proceed to block 410. At block 410 the device may receive and/or identify user input from the person that the person is providing to adjust (or further adjust) one or more of the vehicle's mechanisms. For example, the person may make additional adjustments to mirror angles or additional adjustments to the positioning of a seat base and back with respect to each other.

From block 410 the logic may then proceed to block 412. At block 412 the device may store user adjustment data indicating the user adjustments that were identified at block

410. The user adjustment data may be stored in cloud storage. The user adjustment data may also be associated with an existing profile if one was identified (resulting in the affirmative determination at diamond 404).

Additionally, if no existing profile was identified earlier in the logic (resulting in the negative determination at diamond 404), a new profile may be created and stored in cloud storage for the person at block 412 using the facial recognition data and/or fingerprint data for person received at block 400, even if the name and other details of the person may not be known to the device and may not be provided by the person. In this way, the person may be identified and have various vehicle adjustments determined by the vehicle and/or made by the person applied in the future based on biometric data without, e.g., the person ever going through a more time-consuming, technologically confusing, and feedback-intensive profile setup process. The user's profiled characteristics themselves may also be stored in the new profile, including height, weight, age, and sex.

From block 412 the logic may in some implementations proceed to block 414. At block 414 the device may grant permission to the server or otherwise allow the server to make the user adjustment data stored in the cloud storage available to other vehicles that the person might in the future approach and sit-down in. Thus, this feature may allow the user to approach and sit in any vehicle that has access to the user's specifications for various vehicle mechanisms, and that vehicle may then apply the user's specifications at that vehicle while autonomously making any further adjustments to vehicle mechanisms given any difference in vehicle dimensions and configurations between the reference vehicle at which the user adjustment data was generated and the "new" vehicle at which the person's specifications will be applied. The autonomous adjustments to compensate for the "new" vehicle may be set according to vehicle manufacturer or software developer code, for example.

The foregoing may occur regardless of whether the "new" vehicle is a personal vehicle, a rental car or car for hire, or a ride-sharing vehicle. For example, if a user hires a ride-sharing service to take the user from point A to point B, the cloud-based platform may be used to notify the "new" ride-sharing vehicle (that the user has never encountered before) to adjust the passenger seat according to the user's specifications when the user comes within a threshold distance of the ride-sharing vehicle but before the user actually enters and sits down in the ride-sharing vehicle. Similarly, if the user rents a rental car to drive from point A to point B himself or herself, the rental car can identify the user by biometric ID to access the user's specifications as stored on the cloud-based platform to apply the user's seat profile/specification to the rental car upon entry even though the user might not have ever been in that rental car before and actually adjusted one or more mechanisms of that car to the user's desired specifications.

Concluding the description of FIG. 4, note that from block 414 the logic may then end or revert back to block 400 to identify the same person at a different time or to identify different people that might enter the vehicle to apply their specifications (e.g., while the user is still sitting in the vehicle or not).

Figure 5:
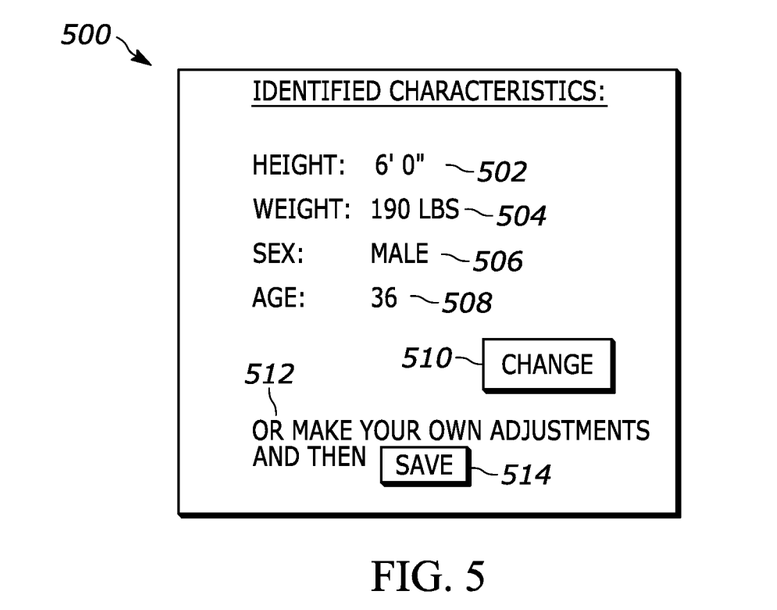
FIG. 5 shows an example graphical user interface (GUI) that may be presented upon a user entering a vehicle consistent with present principles.

Before describing FIG. 5, note that biometric identification that may be used to identify a person consistent with present principles may not be limited to facial recognition and fingerprint identification. For example, they may also include voice identification, iris recognition, or retina scanning.

Also before describing FIG. 5 and as alluded to above, note that adjustments to certain vehicle mechanisms such as seat adjustments may be applied for any seat of the vehicle that the person is identified as sitting in, including the driver's seat, the front passenger seat, and any rear passenger seats. The seat adjustments themselves may have been set based on input from the person and/or based on profiling the person as described herein. As another example, if the vehicle has local climate control capability where different sections of the interior of the vehicle may be heated or cooled in different ways at the same time through the vehicle's HVAC system, then the person's preferred ambient air temperature may be applied in the section of the vehicle in which the person is identified as sitting (e.g., using a camera inside the vehicle). Furthermore, if the person is identified as sitting in the driver's seat, his or her specifications for suspension configuration and electronic entertainment system settings may take priority and be selected for application over any other people identified as sitting within passenger seats of the vehicle.

Now describing FIG. 5, it shows an example graphical user interface (GUI) 500 that may be presented on an electronic display located within a vehicle configured to operate consistent with present principles. The GUI 500 may be presented responsive to profiling a person that is about to enter the vehicle or has entered the vehicle, where that person has not already had a preconfigured profile associated with him or her that would indicate adjustments to various vehicle mechanisms to make.

As shown, the GUI 500 may include a section indicating various profiled characteristics of the person, including an identified height 502, identified weight 504, identified sex 506, and identified age 508. The GUI 500 may also include a selector 510 that may be selectable by the person using touch or cursor input to provide a command to present another GUI at which any of the profiled characteristics can be changed by the person, e.g., if the profiling was slightly off from the person's actual characteristics so that the actual characteristics may be used by the vehicle for determining various configurations of mechanisms to perform consistent with present principles.

The GUI 500 may also include a prompt 512 instructing the person that the person can personally make additional adjustments to various vehicle mechanism and then select the save button 514 in order to save the configurations of various mechanisms for future use as adjusted by the person.

Figure 6:
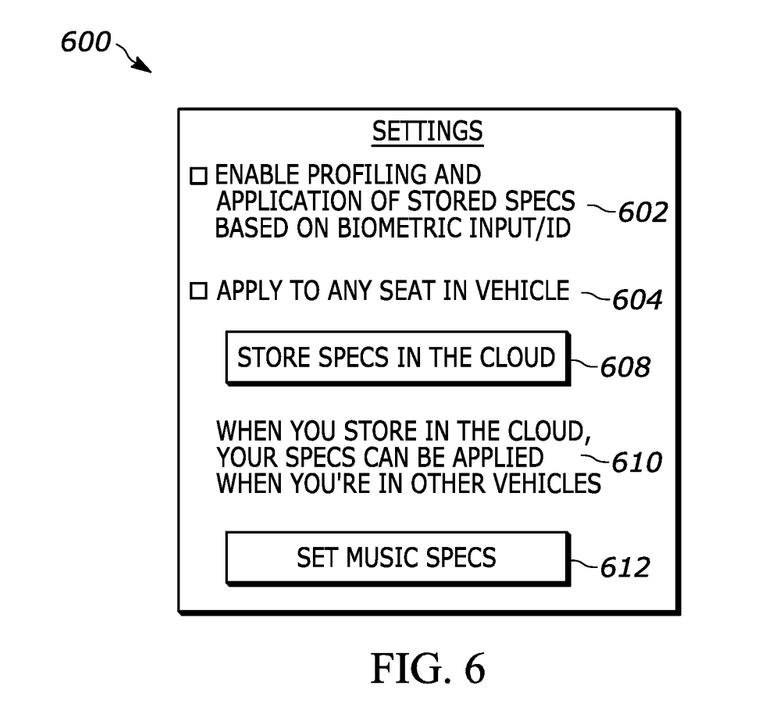
FIG. 6 shows an example GUI for configuring one or more settings of a device/vehicle to operate consistent with present principles.

Continuing the detailed description in reference to FIG. 6, another example GUI 600 is shown. The GUI 600 may be presented the vehicle's electronic display (or another display) upon user command in order to configure one or more settings of a device/vehicle operating consistent with present principles.

As shown, the GUI 600 may include a first option or setting 602 that may be selectable to enable or set the device/vehicle to profile people and/or apply stored specifications based on biometric identification. For example, the option 602 may be selected using the adjacent check box in order to enable or set the device/vehicle to undertake the logic of FIG. 4 and/or present the GUI 500 of FIG. 5.

The GUI 600 may also include a second option or setting 604 that may be selectable to enable or set the device/vehicle to specifically apply a person's seat assembly specifications to any seat in the vehicle that the person might be in rather than, e.g., only the driver's seat when the person is located in the driver's seat.

As also shown in FIG. 6, the GUI 600 may include a selector 608 that may be selectable to provide authorization and a command for the device/vehicle to store the person's specifications in cloud storage for future application at the same vehicle and other potential vehicles. The selector 608 may even be accompanied by a prompt 610 indicating that when the person's specifications are stored in cloud storage, the specifications can be applied when the person is in other vehicles.

Still further, if desired the GUI 600 may also include a selector 612. The selector 612 may be selectable to provide a command for another GUI to be presented from which the person may select one or more pieces or types of music to auto-play upon the person entering the vehicle.

Before concluding, note that in some implementations certain actions and logic steps discussed above may be executed by a device separate from an on-board computer system of the vehicle itself, such as a user's smart phone. For example, a profile may be created for a person by the vehicle but then the profile may be transmitted to the user's smart phone for the smart phone to then upload the profile to cloud storage.

It may now be appreciated that present principles provide for an improved computer-based user interface that improves the functionality and ease of use of the devices and vehicles disclosed herein. The disclosed concepts are rooted in computer technology for computers and smart vehicles to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A vehicle, comprising:
   a motor;
   a drive train and chassis;
   a battery;
   a seat assembly comprising a seat in which people can sit;
   at least one processor;
   a camera accessible to the at least one processor; and
   storage accessible to the at least one processor and comprising instructions executable by the at least one processor to:
   receive input from the camera;
   based on the input from the camera, profile a person; and
   based on the profiling of the person, adjust the vehicle's suspension system;
   wherein the instructions are executable to:
   receive one or more wireless signals from a client device different from the vehicle;
   based on the one or more wireless signals, identify a profile for the person; and
   based on the identification of the profile; adjust at least one mechanism of the vehicle;
   wherein the instructions are executable to:
   identify the profile based on the one or more wireless signals and based on the client device coming within a threshold distance of the vehicle;
   wherein the instructions are executable to:
   determine the client device as coming within the threshold distance of the vehicle using a received signal strength indicator (RSSI) algorithm.

2. The vehicle of claim 1, wherein the instructions are executable to:
   based on the profiling of the person, adjust a height of the vehicle's suspension system.

3. The vehicle of claim 1, wherein the one or more wireless signals indicate a media access control (MAC) address of the client device.

4. The vehicle of claim 1, wherein the instructions are executable to:
   based on the profiling of the person, adjust a heating ventilation and air conditioning HVAC) system of the vehicle.

5. The vehicle of claim 4, wherein adjusting the HVAC system of the vehicle comprises setting the HVAC system to maintain a particular ambient air temperature inside the vehicle.

6. The vehicle of claim 4, wherein adjusting the HVAC system of the vehicle comprises setting the HVAC system to use a particular fan speed for the HVAC system.

7. The vehicle of claim 4, wherein adjusting the HVAC system of the vehicle comprises setting the HVAC system to maintain different particular local climate control temperatures for respective different sections of the interior of the vehicle.

8. A method, comprising:
   receiving, at a vehicle, data related to a person;
   correlating the data to a configuration of an assembly of the vehicle; and
   based on the correlation and based on a device different from the vehicle coming within a threshold distance of the vehicle, adjusting a height of the vehicle's suspension system.

9. The method of claim 8, wherein the configuration relates to a particular position of a base of a seat of a seat assembly, and wherein the method comprises:
   identifying the person as sitting in the seat; and
   adjusting the seat assembly to the configuration responsive to identifying the person as sitting in the seat.

10. The method of claim 8, comprising:
    determining the device as coming within the threshold distance of the vehicle using a received signal strength indicator (RSSI) algorithm.

11. The method of claim 8, comprising:
    based on the data, adjusting a heating ventilation and air conditioning (HVAC) system of the vehicle.

12. The method of claim 11, wherein adjusting the HVAC system of the vehicle comprises setting the HVAC system to maintain a particular ambient air temperature inside the vehicle.

13. The method of claim 11, wherein adjusting the HVAC system of the vehicle comprises setting the HVAC system to use a particular fan speed for the HVAC system.

14. The method of claim 11, wherein adjusting the HVAC system of the vehicle comprises setting the HVAC system to maintain different particular local climate control temperatures for respective different sections of the interior of the vehicle.

15. At least one computer readable storage medium (CRSM) that is not a transitory signal, the computer readable storage medium comprising instructions executable by at least one processor to:
    receive, at a vehicle, data related to a person;
    correlate the data to a configuration of one or more mechanisms of the vehicle; and
    based on the correlation and based on a device different from the vehicle coming within a threshold distance of the vehicle, configure the one or more mechanisms of the vehicle at least by adjusting the vehicle's suspension system.

16. The CRSM of claim 15, wherein the instructions are executable to:
    determine the device as coming within the threshold distance of the vehicle using a received signal strength indicator (RSSI) algorithm.

17. The CRSM of claim 15, wherein the instructions are executable to:
    based on the data related to the person, adjust a heating ventilation and air conditioning (HVAC) system of the vehicle.

18. The CRSM of claim 17, wherein adjusting the HVAC system of the vehicle comprises setting the HVAC system to maintain a particular ambient air temperature inside the vehicle.

19. The CRSM of claim 17, wherein adjusting the HVAC system of the vehicle comprises setting the HVAC system to use a particular fan speed for the HVAC system.

20. The CRSM of claim 17, wherein adjusting the HVAC system of the vehicle comprises setting the HVAC system to maintain different particular local climate control temperatures for respective different sections of the interior of the vehicle.

* * * * *